United States Patent
Yoshimura et al.

(10) Patent No.: US 12,148,100 B2
(45) Date of Patent: *Nov. 19, 2024

(54) INFORMATION PROCESSING APPARATUS, INFORMATION PROCESSING METHOD, AND STORAGE MEDIUM FOR GENERATING A VIRTUAL VIEWPOINT IMAGE

(71) Applicant: CANON KABUSHIKI KAISHA, Tokyo (JP)

(72) Inventors: Kazuhiro Yoshimura, Kanagawa (JP); Yosuke Okubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/225,936

(22) Filed: Apr. 8, 2021

(65) Prior Publication Data

US 2021/0225080 A1 Jul. 22, 2021

Related U.S. Application Data

(63) Continuation of application No. 16/459,238, filed on Jul. 1, 2019, now Pat. No. 11,004,267.

(30) Foreign Application Priority Data

Jul. 4, 2018 (JP) .................................. 2018-127309

(51) Int. Cl.
*G06T 19/00* (2011.01)
*G06T 15/20* (2011.01)

(52) U.S. Cl.
CPC ............ *G06T 19/00* (2013.01); *G06T 15/205* (2013.01); *G06T 2219/004* (2013.01)

(58) Field of Classification Search
None
See application file for complete search history.

(56) References Cited

U.S. PATENT DOCUMENTS

2002/0067412 A1\* 6/2002 Kawai ................ H04N 5/23299
348/E7.086
2009/0066696 A1\* 3/2009 Williams ............... H04N 5/272
345/427

(Continued)

FOREIGN PATENT DOCUMENTS

JP 2002260015 A 9/2002
JP 2003008990 A 1/2003

(Continued)

*Primary Examiner* — Jeffrey J Chow
(74) *Attorney, Agent, or Firm* — Canon U.S.A., Inc. IP Division

(57) ABSTRACT

An information processing apparatus enables a user viewing a displayed virtual viewpoint image to easily understand the state in a generation target scene of the virtual viewpoint image. The information processing apparatus generates a layout that is a figure representing a position of an object included in an imaging target area captured by a plurality of imaging units from different directions, and controls a display unit to display a virtual viewpoint image and the generated layout. The virtual viewpoint image is generated based on images acquired by the plurality of imaging units and viewpoint information indicating a virtual viewpoint.

22 Claims, 11 Drawing Sheets

(56) References Cited

U.S. PATENT DOCUMENTS

| | | | | |
|---|---|---|---|---|
| 2010/0171834 | A1* | 7/2010 | Blumenfeld | H04N 7/185 348/E7.086 |
| 2014/0053077 | A1* | 2/2014 | Unnikrishnan | G06F 3/04847 715/747 |
| 2014/0300644 | A1* | 10/2014 | Gillard | H04N 23/698 345/660 |
| 2016/0063671 | A1* | 3/2016 | Piippo | G06T 15/20 345/676 |
| 2016/0127692 | A1* | 5/2016 | Yoneji | G06V 20/10 348/159 |
| 2017/0085803 | A1* | 3/2017 | Chin | H04N 5/23216 |
| 2017/0153788 | A1* | 6/2017 | Vilermo | G06F 3/04815 |
| 2018/0018510 | A1* | 1/2018 | Williams | G06K 9/6215 |
| 2018/0054659 | A1* | 2/2018 | Goswami | H04N 13/243 |
| 2019/0268625 | A1* | 8/2019 | Jeon | H04N 21/8586 |
| 2019/0321683 | A1* | 10/2019 | Yerli | H04N 21/21805 |
| 2021/0152808 | A1* | 5/2021 | He | H04N 21/84 |

FOREIGN PATENT DOCUMENTS

| | | | |
|---|---|---|---|
| JP | 2005100367 | A | 4/2005 |
| JP | 2011130323 | A | 6/2011 |
| JP | 2014215828 | A | 11/2014 |
| JP | 2017191492 | A | 10/2017 |
| JP | 2018081630 | A | 5/2018 |
| WO | 2017/038541 | A1 | 3/2017 |

* cited by examiner

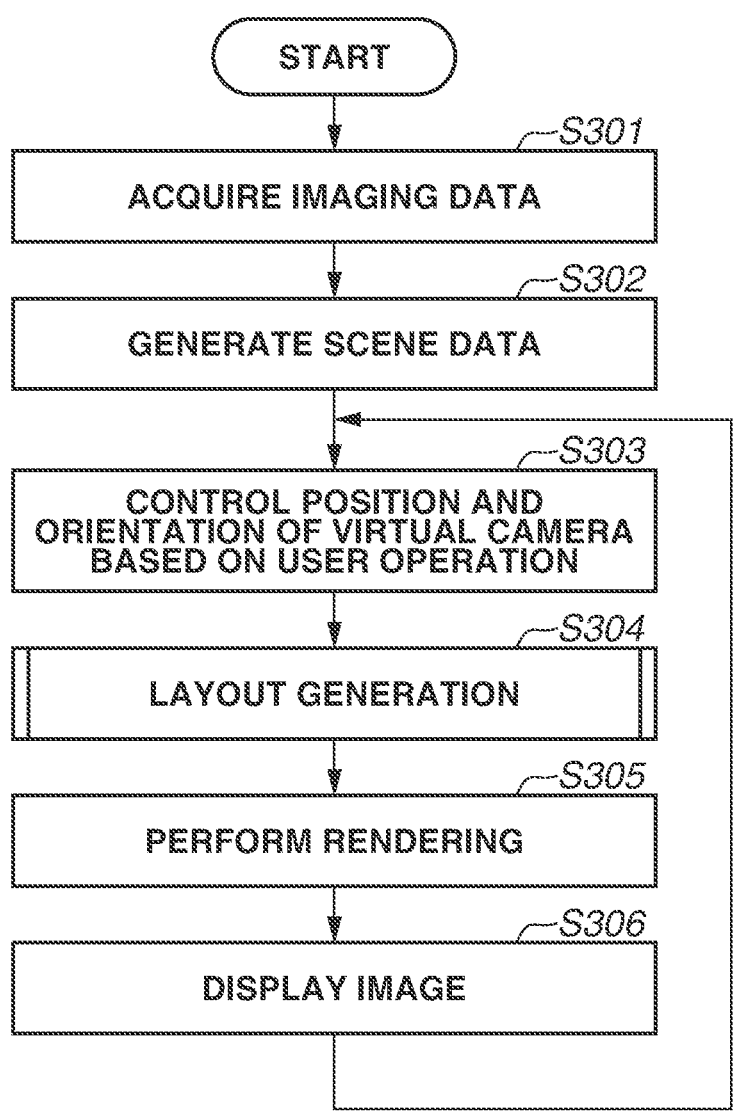

FIG.4A
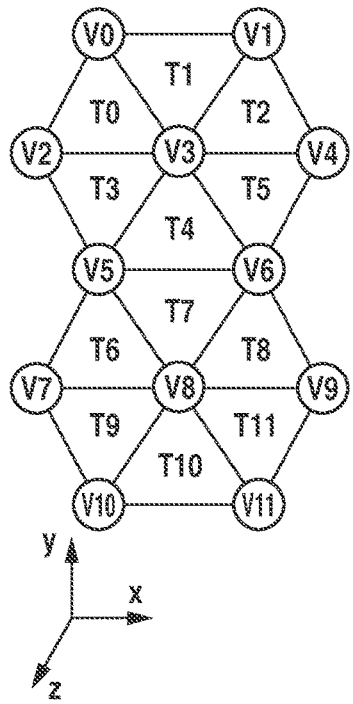
FIG.4B
| VERTEX | xyz COORDINATES | | |
|---|---|---|---|
| V0 | x0 | y0 | z0 |
| V1 | x1 | y1 | z1 |
| V2 | x2 | y2 | z2 |
| V3 | x3 | y3 | z3 |
| V4 | x4 | y4 | z4 |
| V5 | x5 | y5 | z5 |
| V6 | x6 | y6 | z6 |
| V7 | x7 | y7 | z7 |
| V8 | x8 | y8 | z8 |
| V9 | x9 | y9 | z9 |
| V10 | x10 | y10 | z10 |
| V11 | x11 | y11 | z11 |
FIG.4C
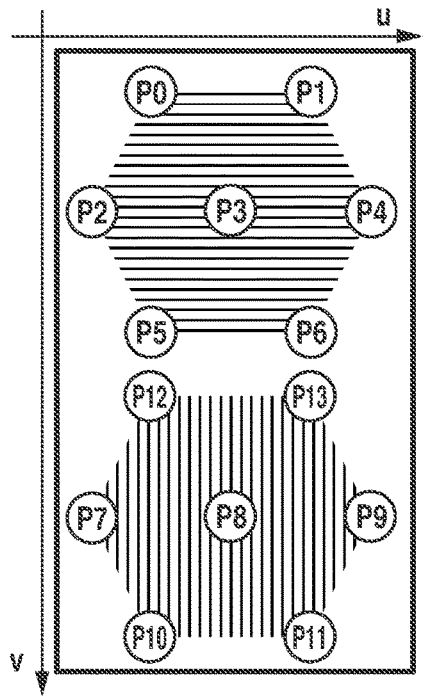
FIG.4D
| TEXTURE VERTEX | uv COORDINATES | |
|---|---|---|
| P0 | u0 | v0 |
| P1 | u1 | v1 |
| P2 | u2 | v2 |
| P3 | u3 | v3 |
| P4 | u4 | v4 |
| P5 | u5 | v5 |
| P6 | u6 | v6 |
| P7 | u7 | v7 |
| P8 | u8 | v8 |
| P9 | u9 | v9 |
| P10 | u10 | v10 |
| P11 | u11 | v11 |
| P12 | u12 | v12 |
| P13 | u13 | v13 |
FIG.4E
| TRIANGLE | VERTEX ID | | | TEXTURE VERTEX ID | | |
|---|---|---|---|---|---|---|
| T0 | V0 | V2 | V3 | P0 | P2 | P3 |
| T1 | V0 | V3 | V1 | P0 | P3 | P1 |
| T2 | V1 | V3 | V4 | P1 | P3 | P4 |
| T3 | V2 | V5 | V3 | P2 | P5 | P3 |
| T4 | V3 | V5 | V6 | P3 | P5 | P6 |
| T5 | V3 | V6 | V4 | P3 | P6 | P4 |
| T6 | V5 | V7 | V8 | P12 | P7 | P8 |
| T7 | V5 | V8 | V6 | P12 | P8 | P13 |
| T8 | V6 | V8 | V9 | P13 | P8 | P9 |
| T9 | V7 | V10 | V8 | P7 | P10 | P8 |
| T10 | V8 | V10 | V11 | P8 | P10 | P11 |
| T11 | V8 | V11 | V9 | P8 | P11 | P9 |

FIG.8A

| OBJECT ID | CLASSIFICATION | TWO-DIMENSIONAL COORDINATES |
|---|---|---|
| 1 | PERSON, A TEAM | x1, y1 |
| 2 | PERSON, B TEAM | x2, y2 |
| 3 | PERSON, B TEAM | x3, y3 |
| 4 | OTHER THAN PERSON | x4, y4 |
| 5 | PERSON, OTHERS | x5, y5 |
| ⋮ | ⋮ | ⋮ |

FIG.8B

| CLASSIFICATION | COLOR | SIZE |
|---|---|---|
| PERSON, A TEAM | RED | RADIUS r |
| PERSON, B TEAM | BLUE | RADIUS r |
| OTHER THAN PERSON | YELLOW | RADIUS r |
| PERSON, OTHERS | WHITE | RADIUS r' |

INFORMATION PROCESSING APPARATUS, INFORMATION PROCESSING METHOD, AND STORAGE MEDIUM FOR GENERATING A VIRTUAL VIEWPOINT IMAGE

This application is a continuation application of U.S. patent application Ser. No. 16/459,238, filed Jul. 1, 2019 which claims the benefit of Japanese Patent Application No. 2018-127309, filed Jul. 4, 2018, all of which is hereby incorporated by reference herein in its entirety.

BACKGROUND

Field of the Disclosure

The present disclosure relates to an information processing apparatus, information processing method, and a storage medium.

Description of the Related Art

A virtual viewpoint image generation technology to generate an image viewed from an optional viewpoint from among images captured by a plurality of cameras from different viewpoints has been known. As a method of generating a virtual viewpoint image (rendering method), for example, a method of generating a virtual viewpoint image based on a predetermined moving path of a virtual viewpoint and a method of generating a virtual viewpoint image based on a position, orientation, etc. of a virtual viewpoint designated by a viewer, etc. have been known.

The virtual viewpoint image generation technology enables a viewer to view, for example, a moving image high in interactivity, whereas it is difficult for the viewer to determine where (what scene) to set a virtual viewpoint in the imaging target when viewing the moving image. Japanese Patent Application Laid-Open No. 2015-187797 discusses a technology to solve the issue. Japanese Patent Laid-Open No. 2015-187797 discusses the technology to generate some recommended viewpoints to enable the viewer to easily view the virtual viewpoint image.

Even when the technology discussed in Japanese Patent Laid-Open No. 2015-187797 is used, the viewer cannot grasp a situation of the scene, for example, a position of an object, such as a person, in an imaging target scene. Therefore, the viewer cannot easily determine where to set a virtual viewpoint or which recommended viewpoint to be selected.

Accordingly, there is a need for a technique that enables a viewer viewing a displayed virtual viewpoint image to easily grasp a situation of a scene from which a virtual viewpoint image is generated.

SUMMARY

According to an aspect of the present disclosure, an information processing apparatus includes a generation unit configured to generate a layout that is a figure representing a position of an object included in an imaging target area captured by a plurality of imaging units from different directions, and a display control unit configured to control a display unit to display a virtual viewpoint image and the layout generated by the generation unit. The virtual viewpoint image is generated based on images acquired by the plurality of imaging units and viewpoint information indicating a virtual viewpoint.

Further features of the present disclosure will become apparent from the following description of exemplary embodiments with reference to the attached drawings.

BRIEF DESCRIPTION OF THE DRAWINGS

FIG. 3 is a flowchart illustrating an example of processing performed by the information processing apparatus.

FIGS. 4A to 4E are diagrams each illustrating an example of scene data.

FIGS. 8A and 8B are diagrams each illustrating an example of data of symbols to be laid out.

DESCRIPTION OF THE EMBODIMENTS

Figure 1:
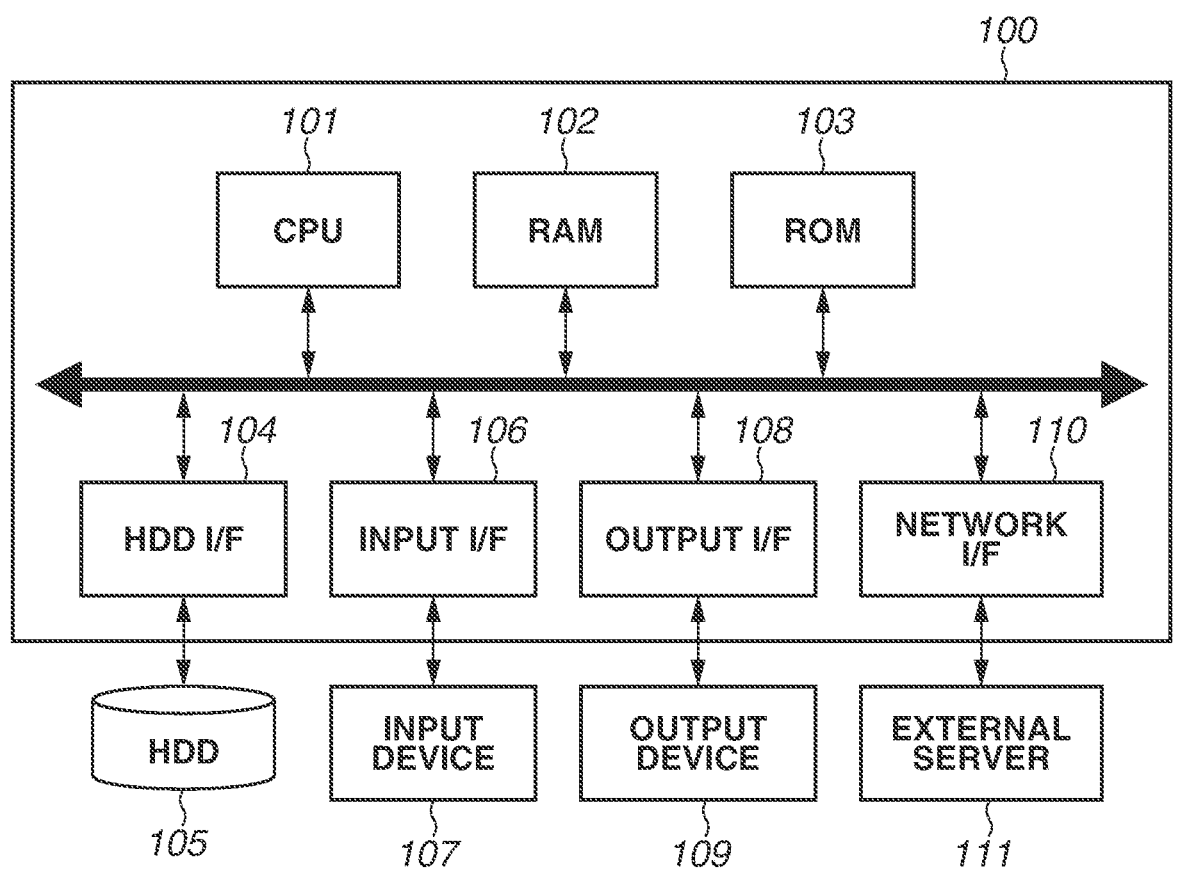
FIG. 1 is a diagram illustrating an example of a hardware configuration of an information processing apparatus.

Exemplary embodiments of the present disclosure are described in detail below with reference to drawings.

A first exemplary embodiment is described below. In the present exemplary embodiment, processing to display, together with a virtual viewpoint image, a layout that is a figure representing positions of objects included in a drawing target scene of the virtual viewpoint image, is described. The virtual viewpoint image is an image from a virtual viewpoint, generated based on a plurality of images captured by a plurality of imaging units imaging a target (e.g., football field) from different directions. The virtual viewpoint image can be regarded as an image captured by a virtual camera that is disposed at the virtual viewpoint and is oriented to a virtual line-of-sight direction. Accordingly, an imaging target area that is captured by the plurality of imaging units (real cameras) from the plurality of directions is the drawing target scene of the virtual viewpoint image. The virtual viewpoint image according to the present exemplary embodiment includes both of a moving image and a still image. In the following, the virtual viewpoint image as the moving image is particularly referred to as a virtual viewpoint video. In the present exemplary embodiment, the objects that are captured by the imaging units disposed at a plurality of different viewpoints and are drawing targets in the virtual viewpoint image are objects (e.g., players, ball, referee, and goalposts) in a football game. The imaging targets, however, are not limited thereto, and may be other sports such as rugby and table tennis, or a concert and a theatrical play on a stage.

Further, data of the virtual viewpoint video may be moving image data in which image frames are compressed by a previously determined moving image compression scheme, or moving image data in which image frames are compressed by a previously determined still image compression scheme. Further, the data of the virtual viewpoint video may be uncompressed moving image data.

FIG. 1 is a diagram illustrating an example of a hardware configuration of an information processing apparatus 100 according to the present exemplary embodiment. The information processing apparatus 100 generates a layout that is a figure representing positions of objects included in the drawing target scene of the virtual viewpoint image, and displays the generated layout together with the virtual viewpoint image. Examples of the information processing apparatus 100 include a personal computer (PC), a server apparatus, and a tablet apparatus.

The information processing apparatus 100 includes a central processing unit (CPU) 101, a random access memory (RAM) 102, and a read only memory (ROM) 103. The information processing apparatus 100 further includes a hard disc drive (HDD) interface (I/F) 104, an input I/F 106, an output I/F 108, and a network I/F 110. The components are connected via a system bus 112 so as to be communicable with one another.

The CPU 101 uses the RAM 102 as a work memory to execute processing based on a program stored in the ROM 103, the HDD 105, etc., and controls the components via the system bus 112. The RAM 102 is a storage device functioning as the work area for the CPU 101, and a temporary data storage area. The ROM 103 is a storage device storing various kinds of programs, setting information, etc.

The HDD I/F 104 is an interface of, for example, a serial advanced technology attachment (SATA) used for connection with a secondary storage device such as the HDD 105, a solid-state drive (SSD), and an optical disk drive. The CPU 101 can perform, via the HDD I/F 104, reading and writing of data from/to the secondary storage device such as the HDD 105 connected to the HDD I/F 104. Further, the CPU 101 develops the data stored in the HDD 105 to the RAM 102. Furthermore, the CPU 101 can store, in the HDD 105, various kinds of data on the RAM 102 obtained through execution of the program.

The input I/F 106 is an interface used for connection with an input device 107 for input of information, such as a keyboard, a mouse, a digital camera, and a scanner. The input I/F 106 is, for example, a universal serial bus (USB) interface and an Institute of Electrical and Electronics Engineers (IEEE) 1394 interface. The CPU 101 can receive, via the input I/F 106, information input by the input device 107.

The output I/F 108 is an interface used for connection with an output device 109 that outputs information, such as a display and a speaker. The output I/F 108 is, for example, a digital visual interface (DVI), and a high-definition multimedia interface (HDMI®). In the present exemplary embodiment, the information processing apparatus 100 is connected to the output device 109 that is a display, via the output I/F 108. The CPU 101 transmits data of the virtual viewpoint image to the output device 109 via the output I/F 108, and causes the output device 109 to display the virtual viewpoint image.

The network I/F 110 is an interface used for communication with an external apparatus such as an external server 111 via a network. The network I/F 110 is a network card such as a local area network (LAN) card. The CPU 101 can input and output information from/to the external server 111 via the network I/F 110.

Figure 2:
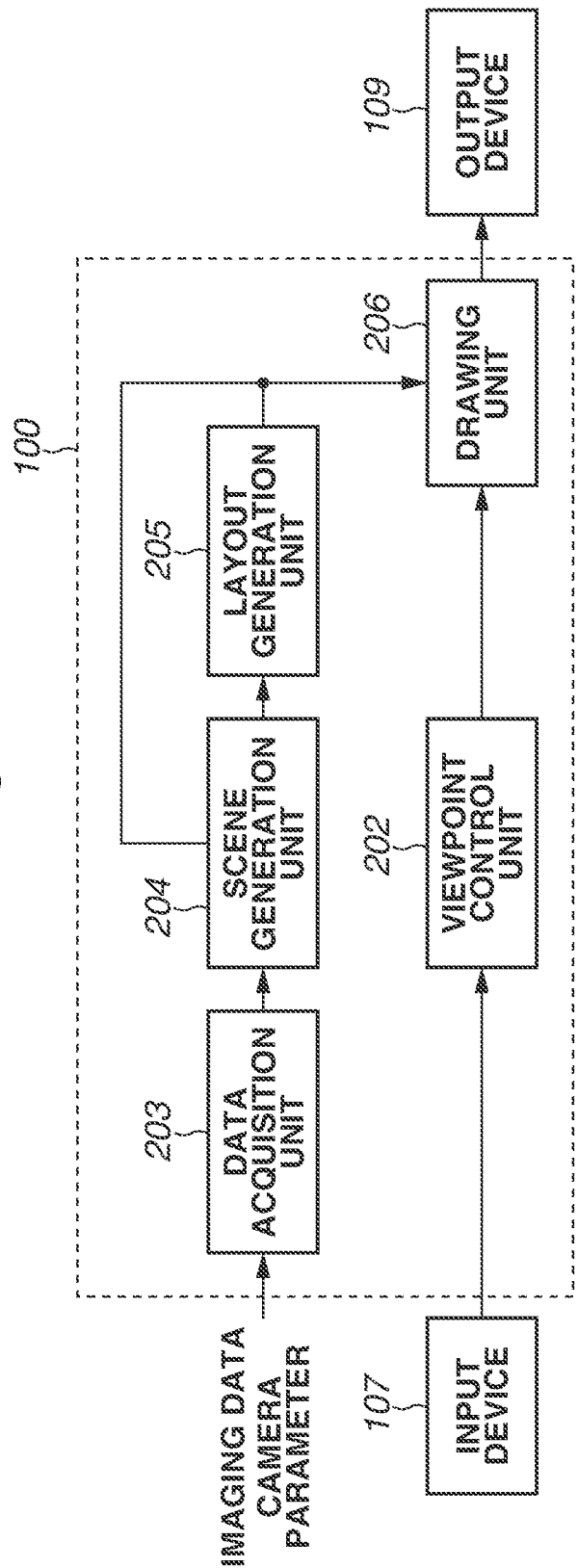
FIG. 2 is a diagram illustrating an example of a functional configuration of the information processing apparatus.

When the CPU 101 executes processing based on the programs stored in the ROM 103, the HDD 105, etc., functions of the information processing apparatus 100 described below with reference to FIGS. 2, 5, and 9, processing in flowcharts described below with reference to FIGS. 3, 6, and 10, etc. are achieved. The information processing apparatus 100 may achieve a part of the functions of the information processing apparatus 100 described below with reference to FIGS. 2, 5, and 9, using dedicated processing circuits corresponding to the respective functions.

In the example of FIG. 1, the HDD 105, the input device 107, the output device 109, and the information processing apparatus 100 are provided as different devices. Alternatively, the HDD 105, the input device 107, and the output device 109 may be, for example, included in the information processing apparatus 100. For example, the information processing apparatus 100 may be a smartphone. In such a case, the input device 107 (touch panel), the output device 109 (display screen), and the HDD 105 (built-in HDD) are integrated with the information processing apparatus 100.

For example, in a case where the information processing apparatus 100 generates the virtual viewpoint image based on an image stored in the HDD 105, it is unnecessary to acquire an image used for generation of the virtual viewpoint image from the external server 111. In such a case, the information processing apparatus 100 may not be connected to the external server 111. Further, for example, in a case where the information processing apparatus 100 generates the virtual viewpoint image based on an image acquired from the external server 111 and executes processing based on the program stored in the ROM 103, the information processing apparatus 100 may not be connected to the HDD 105.

In addition, the information processing apparatus 100 may include a plurality of CPUs 101. The information processing apparatus 100 may include one or a plurality of dedicated hardware or graphic processing units (GPUs) different from the CPU 101 and execute at least a part of the processing performed by the CPU 101 with use of the GPUs and the dedicated hardware. Examples of such dedicated hardware include an application specific integrated circuit (ASIC), a field programmable gate array (FPGA), and a digital signal processor (DSP).

In the present exemplary embodiment, a description is given of processing for generating, in addition to the virtual viewpoint image, a layout that is a figure representing positions of objects based on images captured from a plurality of different viewpoints and for displaying the layout together with the virtual viewpoint image in order to improve viewer's comprehension of a scene.

In the following, the processing executed by the information processing apparatus 100 according to the present exemplary embodiment is described with reference to FIG. 2 and FIG. 3. FIG. 2 is a diagram illustrating an example of the functional configuration of the information processing apparatus 100 according to the present exemplary embodiment. FIG. 3 is a flowchart illustrating an example of the processing executed by the information processing apparatus 100 according to the present exemplary embodiment.

The functional configuration of the information processing apparatus 100 is described with reference to FIG. 2. The information processing apparatus 100 includes a viewpoint control unit 202, a data acquisition unit 203, a scene generation unit 204, a layout generation unit 205, and a drawing unit 206.

The viewpoint control unit 202 receives input of a parameter (e.g., viewpoint position, line-of-sight direction, and angle of view) to determine a drawing target range of the virtual viewpoint image input by a user via the input device 107. The viewpoint control unit 202 determines the parameter indicated by the received input as viewpoint information indicating a virtual viewpoint relating to generation of the virtual viewpoint image. In the present exemplary embodiment, the information processing apparatus 100 manages the parameter for determining the drawing target range of the virtual viewpoint image, as a camera parameter of a virtual camera (hereinafter, virtual camera parameter). The camera parameter indicates a state of the camera. The camera parameter includes an external parameter indicating a position and orientation of the camera and an internal parameter (e.g., angle of view, focal length, exposure time) indicating optical characteristics of the camera.

The data acquisition unit 203 acquires, from the HDD 105 and the external server 111, a plurality of images captured by the imaging units disposed at the plurality of different positions and to be used for generation of the virtual viewpoint image, and data such as the camera parameter of each of the imaging units.

The scene generation unit 204 generates scene data to be used for rendering of the virtual viewpoint image, based on the images and the camera parameters (viewpoint information) acquired by the data acquisition unit 203. The scene data indicates a predetermined three-dimensional shape and a predetermined color of each of objects (e.g., players, ball, goalposts, and referees) in the drawing target scene of the virtual viewpoint image to be generated. The scene data is, for example, polygon data and texture data.

The layout generation unit 205 generates a layout that is a figure representing positions of the objects in the scene data, based on the scene data generated by the scene generation unit 204.

The drawing unit 206 generates the virtual viewpoint image based on the scene data generated by the scene generation unit 204 and the virtual camera parameter determined by the viewpoint control unit 202. The drawing unit 206 then outputs the generated virtual viewpoint image and the layout generated by the layout generation unit 205 to the output device 109. The output device 109 functions as a display unit that displays an image based on an input from the drawing unit 206. At this time, the drawing unit 206 may output the virtual viewpoint image and the layout as separate data, or may output data of the virtual viewpoint image combined with the layout. The drawing unit 206 may output the virtual viewpoint image and the layout to a storage device. The drawing unit 206 may include a display unit and may display the generated virtual viewpoint image and the generated layout on the display unit.

The processing performed by the information processing apparatus 100 according to the present exemplary embodiment is described with reference to FIG. 3.

In step S301, the data acquisition unit 203 acquires, from the external server 111, data of the plurality of images captured by the plurality of imaging units disposed at the plurality of different positions and to be used for generation of the virtual viewpoint image, and data of the respective camera parameters of the imaging units. The data acquisition unit 203 may acquire these data from the HDD 105. The data acquisition unit 203 outputs the acquired data of the images and the camera parameters to the scene generation unit 204.

In step S302, the scene generation unit 204 generates scene data representing a three-dimensional state to be used in rendering of the virtual viewpoint image, based on the images and the camera parameters acquired in step S301. For example, the scene generation unit 204 detects each of areas separated by background subtraction, as an area of each of the objects from the images acquired in step S301. Further, the scene generation unit 204 generates scene data for each of the objects, based on the detected area of each of the objects and the camera parameter acquired in step S301. The scene data will be described. In the present exemplary embodiment, the scene data is generated for each of the objects, and includes three data of three-dimensional (3D) polygon data, texture data, and UV map data that associates the 3D polygon data and the texture data with each other.

FIGS. 4A and 4B are diagrams each illustrating the 3D polygon data included in the scene data. FIG. 4A is a diagram illustrating triangles T0 to T11 and vertices V0 to V11 forming the triangles T0 to T11 in a three-dimensional space. FIG. 4B is a diagram illustrating coordinates, in a predetermined three-dimensional coordinate system, of the vertices V0 to V11 in FIG. 4A.

FIGS. 4C and 4D are diagrams each illustrating an example of the texture data included in the scene data. FIG. 4C is a diagram illustrating positions P0 to P13 that correspond to the respective vertices of a shape in a texture image. FIG. 4D is a diagram illustrating coordinates, in a predetermined two-dimensional coordinate system, of the texture vertices P0 to P13 in FIG. 4C.

FIG. 4E is a diagram illustrating an example of the UV map included in the scene data. A table in FIG. 4E is an example of a table illustrating correspondence between the vertex IDs in the three-dimensional space which form a triangle and the texture vertex IDs in the texture image space, for each of the triangles illustrated in FIG. 4A. The scene generation unit 204 specifies a triangle in the coordinate system of FIG. 4C which corresponds to vertices of a triangle representing the 3D polygon illustrated in FIG. 4A, for example, based on the table of FIG. 4E. Further, the scene generation unit 204 determines texture data indicated by the specified triangle in FIG. 4C as texture data to be appended to the corresponding triangle in the three-dimensional coordinate system in FIG. 4A.

The scene generation unit 204 generates scene data that includes 3D polygon data, texture data, and UV map data for each of the objects included in the scene corresponding to the scene data. In the present exemplary embodiment, the scene generation unit 204 uses Visual Hull algorithm to acquire voxel information and reconstructs the 3D polygon in order to generate the 3D polygon data. Alternatively, the scene generation unit 204 may generate the 3D polygon by, for example, directly converting the voxel information into a polygon model. The scene generation unit 204 may generate the 3D Polygon by applying Poisson Surface Reconstruction (PSR) to point groups acquired from a depth map that is acquired with use of an infrared sensor. The scene generation unit 204 may acquire the point groups through stereo matching using an image feature, typified by Patch-based Multi-view Stereo (PMVS).

The scene generation unit 204 generates the texture data. The scene generation unit 204 specifies points corresponding to the vertices of a triangle forming the generated 3D polygon in the image acquired by the data acquisition unit 203. At this time, the scene generation unit 204 specifies the points by projecting the vertices of the 3D polygon onto the image acquired by the data acquisition unit 203, for example, based on the camera parameter acquired by the data acquisition unit 203. Further, the scene generation unit 204 specifies an area surrounded by the specified three points in the image acquired by the data acquisition unit 203. The scene generation unit 204 performs the similar processing on each of the images acquired by the data acquisition unit 203.

The scene generation unit 204 determines the texture to be appended to the corresponding polygon based on the specified areas in the respective images. For example, the scene generation unit 204 determines an average of all of the specified areas as a texture image to be appended to the corresponding polygon. The scene generation unit 204 may determine an average of designated areas among the specified areas as the texture image to be appended to the corresponding polygon. The scene generation unit 204 may determine one designated area among the specified areas as the texture image to be appended to the corresponding polygon. The scene generation unit 204 draws the determined texture image on a plane in the predetermined two-dimensional coordinate system as illustrated in FIG. 4C, and the plane image is determined as the texture image recording the texture.

The scene generation unit 204 generates the corresponding UV map in addition to determination of the texture data to be appended to the polygon. For example, the scene generation unit 204 stores, in the table of the UV map, correspondence between IDs of three vertices of a polygon and IDs of three vertices corresponding to the three vertices of the polygon in the texture image.

The scene generation unit 204 outputs, to the layout generation unit 205 and the drawing unit 206, the scene data that includes the generated polygon data, the generated texture data, and the generated UV map data.

In step S303, the viewpoint control unit 202 receives input from the user via the input device 107, determines the virtual camera parameter to be used for generation of the virtual viewpoint image based on the received input, and outputs the determined virtual camera parameter to the drawing unit 206. More specifically, the viewpoint control unit 202 receives input of the position and the orientation of the virtual camera from the user via the input device 107, and determines the virtual camera parameter representing the position and the orientation of the virtual camera according to the received input. For example, by detecting that the mouse has been moved in a right direction by the user, the viewpoint control unit 202 determines the virtual camera parameter (external parameter) so as to rotate the orientation of the virtual camera in the right direction. For example, by detecting that the mouse has been moved in an upward direction by the user, the viewpoint control unit 202 determines the virtual camera parameter (external parameter) so as to change the orientation of the virtual camera in the upward direction.

The external parameter and the internal parameter included in the camera parameter are described in more detail. A vector t represents a position (position of an origin in a camera coordinate system determined based on a virtual camera) of an imaging unit (virtual camera in the present exemplary embodiment) in a predetermined world coordinate system. In addition, a matrix R represents the orientation of the virtual camera (i.e., represents an orientation in a camera coordinate system with respect to the world coordinate system and rotation between the world coordinate system and the camera coordinate system). In this case, the external parameter of the virtual camera can be expressed by the following expression (1). The camera coordinate system of the virtual camera and the world coordinate system are left-handed coordinate systems. Further, in the camera coordinate system, a right direction is denoted by +x direction, an upward direction is denoted by +y direction, and a depth direction is denoted by +z direction in a case of being directed to the line-of-sight direction of the virtual camera from the virtual viewpoint.

$$\begin{bmatrix} R & t \\ 0 & 1 \end{bmatrix} \tag{1}$$

Further, when the position of a principle point of the image captured by the virtual camera in the coordinate system in the image is denoted by (cx, cy), and a focal length of the camera is denoted by f, an internal parameter K of the virtual camera can be expressed by the following expression (2).

$$K = \begin{bmatrix} f & 0 & c_x \\ 0 & f & c_y \\ 0 & 0 & 1 \end{bmatrix} \tag{2}$$

The viewpoint control unit 202 may express the camera parameter by an expression other than the matrix. For example, the viewpoint control unit 202 may express the position of the virtual camera by the three-dimensional coordinate, and express the orientation of the virtual camera by enumeration of values of yaw, roll, and pitch. For example, the viewpoint control unit 202 may determine information representing a zoom value of the virtual camera as the internal parameter of the virtual camera.

In step S304, the layout generation unit 205 generates a layout representing the positions of the objects based on the scene data generated in step S302. The layout generation unit 205 outputs the generated layout to the drawing unit 206. The detail of the processing in step S304 is described below with reference to FIG. 5 and FIG. 6. In step S305, the drawing unit 206 generates the virtual viewpoint image based on the scene data generated by the scene generation unit 204 in step S302 and the virtual camera parameter determined by the viewpoint control unit 202 in step S303. The drawing unit 206 then generates a screen to be displayed on the output device 109. The screen includes the generated virtual viewpoint image and the layout generated by the layout generation unit 205 in step S304.

In step S306, the drawing unit 206 displays the screen generated in step S305 on the output device 109. The processing in steps S305 and S306 is an example of display control processing for displaying the layout together with the virtual viewpoint image on the display unit.

The flow of the processing executed by the information processing apparatus 100 according to the present exemplary embodiment has been described above.

The detail of the processing for generating the layout by the layout generation unit 205 is described with reference to FIG. 5 and FIG. 6. FIG. 5 is a diagram illustrating an example of the detail of the layout generation unit 205. FIG. 6 is a flowchart that illustrates an example of the processing performed by the information processing apparatus 100 and illustrates the detail of the processing in step S304.

The detail of the layout generation unit 205 is described with reference to FIG. 5.

The layout generation unit 205 includes a scene acquisition unit 501, a position/size acquisition unit 502, a texture color acquisition unit 503, a classification unit 504, and a layout determination unit 505.

The scene acquisition unit 501 acquires the scene data generated by the scene generation unit 204. The position/size acquisition unit 502 acquires, based on the scene data acquired by the scene acquisition unit 501, respective positions and sizes of objects in the scene represented by the scene data. The texture color acquisition unit 503 acquires, based on the scene data acquired by the scene acquisition unit 501, respective colors of the objects in the scene represented by the scene data.

The classification unit 504 classifies the objects in the scene corresponding to the scene data acquired by the scene acquisition unit 501, into a plurality of groups, based on the positions and the sizes acquired by the position/size acquisition unit 502 and the colors acquired by the texture color acquisition unit 503. The layout determination unit 505 determines a layout representing the respective positions of the objects classified into the plurality of groups by the classification unit 504.

It is sufficient for the information processing apparatus 100 to display the layout representing at least the respective positions of the objects. In other words, the information processing apparatus 100 may display the layout without classifying the plurality of objects into groups, or may not acquire information on at least either of the sizes or the colors of the objects. However, when the information processing apparatus 100 acquires the information on the positions, the sizes, and the colors of the objects, classifies the plurality of objects into groups, and displays the layout as described above, it is possible to notify the user of the more detailed state of the target scene.

The detail of the processing in step S304 is described with reference to FIG. 6.

In step S601, the layout generation unit 205 determines whether to display the layout. For example, flag information indicating whether to display the layout is stored in the HDD 105, and the layout generation unit 205 acquires the flag information from the HDD 105. Further, the layout generation unit 205 determines whether to display the layout based on whether the acquired flag information indicates displaying the layout. In a case where the acquired flag information indicates displaying the layout, the layout generation unit 205 determines to display the layout. In a case where the acquired flag information indicates not displaying the layout, the layout generation unit 205 determines not to display the layout. The CPU 101 can update the content of the flag information stored in the HDD 105 based on the input by the user via the input device 107.

In the case where the layout generation unit 205 determines to display the layout (YES in step S601), the processing proceeds to step S602. In a case where the layout generation unit 205 determines not to display the layout (NO in step S601), the processing in FIG. 6 is ended.

In step S602, the scene acquisition unit 501 acquires the scene data generated in step S302 and outputs the acquired scene data to the position/size acquisition unit 502 and the texture color acquisition unit 503.

In step S603, the position/size acquisition unit 502 acquires information on the position and the size of each of the objects based on the scene data acquired in step S602. The scene data acquired in step S602 includes three-dimensional coordinate information on vertices of the polygon forming each of the objects as illustrated in FIG. 4B. Therefore, the position/size acquisition unit 502 acquires the size and the position of each of the objects based on, for example, the positions of the vertices of the polygon forming each of the objects included in the scene data.

In the present exemplary embodiment, the position/size acquisition unit 502 determines an average of the vertex coordinates of each polygon representing an object and acquires the position of the determined average of the coordinates as the position of the object. Alternatively, the position/size acquisition unit 502 may acquire a position of a centroid of the entire polygon representing an object, as the position of the object.

In the present exemplary embodiment, the position/size acquisition unit 502 determines a magnitude of difference between the maximum value and the minimum value (i.e., |maximum value−minimum value|) of the coordinates of the vertices of the polygon representing an object, in each of the x axis, the y axis, and the z axis. Further, the position/size acquisition unit 502 acquires a set of three determined values in the x axis, the y axis, and the z axis, as the size of the object. The position/size acquisition unit 502 may acquire a value of a volume obtained by multiplying the three determined values in the x axis, the y axis, and the z axis, as the size of the object. The position/size acquisition unit 502 may acquire a volume of a portion surrounded by the polygon representing the object, as the size of the object.

The position/size acquisition unit 502 outputs, to the classification unit 504, the acquired information on the position and the size of each of the objects.

In step S604, the texture color acquisition unit 503 acquires color information on each of the objects based on the scene data acquired in step S602. The scene data acquired in step S602 includes the texture image as illustrated in FIG. 4C for each of the objects. The texture color acquisition unit 503 acquires the color of each of the objects based on the texture image included in the scene data. In the present exemplary embodiment, the texture color acquisition unit 503 specifies top three colors high in frequency of occurrence, among the colors of the pixels in the texture image, and acquires the three specified colors as the colors of each of the objects. In the present exemplary embodiment, a plurality of colors is previously determined, and a range of a pixel value corresponding to each of the colors is previously determined. The texture color acquisition unit 503 specifies the color of each of the pixels by, for example, specifying a color range corresponding to the color that the pixel value of each of the pixels in the texture image belongs to.

Alternatively, the texture color acquisition unit 503 may acquire, as the color of an object, one color of a specific area of the object (e.g., color of clothing) with reference to the polygon data and the UV map of the object. The texture color acquisition unit 503 outputs the acquired information on the color of each of the objects to the classification unit 504.

In step S605, the layout generation unit 205 determines whether the position, the size, and the color of each of the objects have been acquired. In a case where the layout generation unit 205 determines that the position, the size, and the color of each of the objects have been acquired (YES in step S605), the processing proceeds to step S606. In a case where the layout generation unit 205 determines that there is an object, the position, the size, and the color of which have not been acquired (NO in step S605), the processing returns to step S602. The layout generation unit 205 then performs the processing in step S602 to S604 on each of the remaining objects.

In step S606, the classification unit 504 classifies the objects into the plurality of groups based on the positions and the sizes acquired in step S603. In the present exemplary embodiment, the classification unit 504 classifies the objects into a person group and a group of others (i.e., a group of objects other than a person). The HDD 105 previously stores information on a possible size range of an object as a person (e.g., 10 cm to 30 cm in lateral direction, 20 cm to 50 cm in vertical direction, and 150 cm to 200 cm in height direction). In a case where the size of an object acquired in step S603 is included in the possible size range of the person indicated by the information stored in the HDD 105, the classification unit 504 classifies the object into the person group. In a case where a size of an object acquired in step S603 is not included in the possible size range of the person indicated by the information stored in the HDD 105, the classification unit 504 classifies the object into the group of others.

The HDD 105 may previously store information on an area where a person as an object can be present. In this case, for example, even if a size of an object acquired in step S603 is included in the possible size range of the person indicated by the information stored in the HDD 105, the classification unit 504 may perform classification in the following manner. In a case where the position of the object acquired in step S603 is included in the area where a person can be present indicated by the information stored in the HDD 105, the classification unit 504 may classify the object into the person group. In a case where the position of the object is not included in the area, the classification unit 504 may classify the object into the group of others. For example, in a case where a player in a sports game is assumed to be an object, it can be considered that the object is located only in a field area. In such a case, it is assumed that information representing the field is previously stored in the HDD 105 as the information of the area where a person as the object can be present. In a case where the position of the object is included in the field, the classification unit 504 may classify the object into the person group based on the information. In a case where the position of the object is not included in the field, the classification unit 504 may classify the object into the group of others based on the information.

In step S607, the classification unit 504 further classifies the objects that have been classified into the person group in step S606, into a plurality of groups based on the color acquired in step S604. In the present exemplary embodiment, it is assumed that a team A and a team B play a football game that is the drawing target of the virtual viewpoint image. Players from the team A each wear a red uniform, and players from the team B each wear a blue uniform.

The classification unit 504 classifies the objects that have been classified into the person group in step S606, into three groups of an team A group, a team B group, and the other group. Information on a color corresponding to each of the team A and the team B (e.g., red corresponding to the team A and blue corresponding to the team B) is previously stored in the HDD 105. The classification unit 504 can acquire the color corresponding to each of the team A and the team B by reading the information. The classification unit 504 classifies an object, the color acquired in step S604 of which includes the color corresponding to the team A, into the team A group, among the objects that have been classified into the person group in step S606. The classification unit 504 classifies an object, the color acquired in step S604 of which includes the color corresponding to the team B, into the team B group, among the objects that have been classified into the person group in step S606.

Further, the classification unit 504 classifies an object, the color acquired in step S604 of which includes neither the color corresponding to the team A nor the color corresponding to the team B, into the other group, among the objects that have been classified into the person group in step S606.

In step S608, the layout determination unit 505 determines the layout based on a result of the classification processing in steps S606 and S607.

Figure 7:
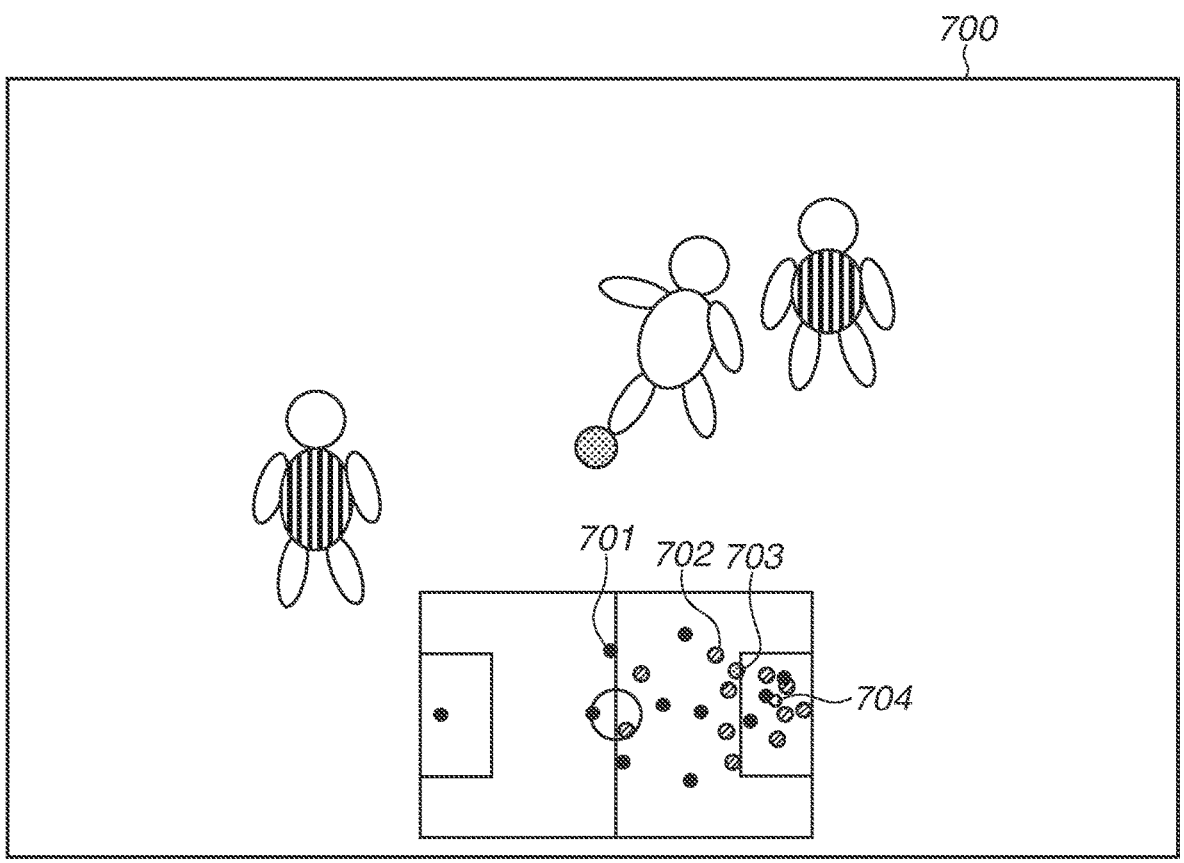
FIG. 7 is a diagram illustrating an example of a layout.

FIG. 7 is a diagram illustrating an example of the layout displayed together with the virtual viewpoint image. FIG. 7 illustrates a state where a virtual viewpoint image 700 is displayed. The layout that represents respective positions of the players as the objects in the football field is displayed in a lower part of the virtual viewpoint image 700. In the layout of FIG. 7, symbols corresponding to the players from the team A, symbols corresponding to the players from the team B, a symbol corresponding to the other person, and a symbol corresponding to an object other than the person are displayed in different modes from one another (e.g., with different colors and different patterns). A symbol 701 corresponds to a player from the team A. A symbol 702 corresponds to a player from the team B. A symbol 703 corresponds to the other person (e.g., referee). A symbol 704 corresponds to an object other than the person (e.g., ball).

In the layout displayed by the information processing apparatus 100, the specified positions of all of the objects in the imaging target area may not displayed. For example, a layout representing the positions of only the objects classified into the person group among the above-described objects may be displayed, or a layout representing the positions of only the players from one of the teams may be displayed. It may be determined the positions of the objects classified into which group are displayed or the positions of which objects are displayed, based on user operation.

The layout explicitly represents the positions of all of the objects in the football pitch when the scene is viewed from above. In the area in the layout, the area other than the symbols and lines indicating the pitch is transparent. Accordingly, for example, in a case where the layout is displayed while being superimposed on the virtual viewpoint image as illustrated in FIG. 7, a part of the virtual viewpoint image is displayed in the transparent area. Although, in the present exemplary embodiment, the layout determination unit 505 determines the layout designed like the layout illustrated in FIG. 7, the layout determination unit 505 may determine a layout of a different design. The layout determination unit 505 may use a symbol having a rectangle shape, a triangle shape, a human shape, etc., in place of the circle, as the symbol representing the object. The layout determination unit 505 may change the pattern of a line drawn in the layout to the other pattern such as a dotted-line pattern.

FIGS. 8A and 8B are diagram each illustrating an example of the layout data used to display the layout. The layout determination unit 505 generates the layout data as illustrated in FIGS. 8A and 8B to determine the layout to be displayed on the output device 109, and outputs the generated layout data to the drawing unit 206.

A table in FIG. 8A illustrates the classification result (belonging group) and the position of each of the objects. Each of the two-dimensional position coordinates in the table of FIG. 8A is a value indicating a position that is obtained by projecting the position in the three-dimensional coordinate system of the object acquired in step S603 onto a two-dimensional plane obtained by viewing the football pitch from above. The position indicated by the two-dimensional position coordinate is a position of the center of the symbol representing the corresponding object. The layout determination unit 505 projects, onto the two-dimensional plane, the position in the three-dimensional coordinate system of each of the objects acquired in step S603, thereby acquiring the coordinate indicating the position of each of the objects on the two-dimensional plane.

As described above, in the present exemplary embodiment, the layout determination unit 505 determines the layout data such that the layout represents a scene viewed from above by acquiring the position projected onto the two-dimensional plane. In addition, the layout determination unit 505 may determine a value indicating a position that is obtained by projecting the position in the three-dimensional coordinate system of the object acquired in step S603, onto a two-dimensional plane obtained by viewing the football pitch from side, as the two-dimensional position coordinate in the table of FIG. 8A.

The layout determination unit 505 acquires the coordinate that is obtained by projecting the position in the three-dimensional coordinate system of the object acquired in step S603, onto the two-dimensional plane obtained by viewing the football field from above, for each of the objects. Further, the layout determination unit 505 performs the following processing based on the classification results in steps S606 and S607 for each of the objects and the acquired coordinate on the two-dimensional plane for each of the objects. The layout determination unit 505 generates a table representing the classification (belonging group) and the two-dimensional coordinate (coordinate in two-dimensional plane) of each of the objects, as illustrated in FIG. 8A.

A table in FIG. 8B represents a display mode of the symbol corresponding to the object in the layout for each group. The table in FIG. 8B illustrates a color and a size (radius of circular symbol) of the symbol representing the object for each classification (belonging group).

In the present exemplary embodiment, information on the table that represents the display mode of the symbol corresponding to each of the objects in the layout for each group as illustrated in FIG. 8B is previously stored in the HDD 105. The layout determination unit 505 determines, as the layout data, the generated table representing the classification and the two-dimensional coordinate for each of the objects as illustrated in FIG. 8A and the table representing the display modes of the symbols as illustrated in FIG. 8B acquired from the HDD 105 and outputs the layout data to the drawing unit 206.

In the present exemplary embodiment, the table representing the display modes of the symbols as illustrated in FIG. 8B is previously stored. Alternatively, the layout determination unit 505 may generate the table representing the display modes of the symbols. The layout determination unit 505 may determine the color of the symbol corresponding to each of the objects, for example, based on the color acquired for each of the objects in step S604. For example, the layout determination unit 505 may determine the color having the highest appearance frequency among the colors acquired for each of the objects in step S604, as the color of the symbol corresponding to the object. Further, the layout determination unit 505 may determine a color obtained by combining the colors acquired for each of the objects in step S604, as the color of the symbol corresponding to the object.

The layout determination unit 505 may determine the size of the symbol corresponding to each of the objects based on the size of each of the objects acquired in step S603. For example, the layout determination unit 505 determine a value obtained by multiplying the size of each of the objects acquired in step S603 by a predetermined coefficient, as the radius of the circular symbol corresponding to the object. Further, the layout determination unit 505 may determine the radius of the circular symbol corresponding to each of the objects, as a predetermined value.

The layout determination unit 505 may generate the table representing the display mode of each of the symbols as illustrated in FIG. 8B, based on the determined color of the symbol corresponding to each of the objects and the size of the symbol corresponding to the object.

When the plurality of objects is close to one another, and the symbols corresponding to the objects are disposed at the positions indicated by the two-dimensional coordinates in the table of FIG. 8A in the layout, these symbols may be displayed such that the symbols are superimposed on one another. To avoid such a situation, the layout determination unit 505 may correct the display position (two-dimensional coordinate) of each of the symbols illustrated in the table of FIG. 8A and the size of each of the symbols illustrated in the table of FIG. 8B. For example, the layout determination unit 505 specifies a distance, in the layout, between respective centers of the symbols corresponding to the objects, based on the two-dimensional coordinates in the table of FIG. 8A. Further, the layout determination unit 505 specifies the size (radius) of each of the symbols based on the sizes in the table of FIG. 8B. The layout determination unit 505 then specifies a pair of the symbols that has the distance therebetween smaller than a sum of the radiuses of the symbols, as a pair of symbols that are superimposed on each other. For example, the layout determination unit 505 moves one of the symbols in a direction opposite to the direction of the other symbol as viewed from the symbol such that the distance between the respective centers of the symbols becomes equal to or larger than the sum of the radiuses of the symbols. As a result, the layout determination unit 505 can eliminate superimposition of the symbols.

For example, the layout determination unit 505 may move each of the symbols in a direction opposite to the direction of the other symbol as viewed from the symbol such that the distance between the respective centers of the symbols becomes equal to or larger than the sum of the radiuses of the symbols. For example, the layout determination unit 505 may reduce the radius of each of the symbols such that the sum of the radiuses of the symbols becomes lower than the distance between the symbols.

The layout determination unit 505 may change the colors in the layout based on the position where the layout is displayed. For example, in a case where any of the predetermined colors in the table of FIG. 8B is difficult to be distinguished from the color of the area of the virtual viewpoint image displayed in the transparent area of the layout, the layout determination unit 505 may change the color in the following manner. The layout determination unit 505 may change the color to a color that is different from the color corresponding to the other classification (other group) illustrated in the table of FIG. 8B among predetermined easily-distinguishable colors.

In the present exemplary embodiment, in step S306, the drawing unit 206 displays the layout in the lower part of the virtual viewpoint image as illustrated in FIG. 7 by superimposing the layout on the virtual viewpoint image. Alternatively, the drawing unit 206 may display the layout in an upper part of the virtual viewpoint image by superimposing the layout on the virtual viewpoint image, or may display the layout at a position not superimposed on the virtual viewpoint image (e.g., side by side with the virtual viewpoint image). For example, the drawing unit 206 may display the layout so as not to be superimposed on a part where the person as the object in the virtual viewpoint image is displayed, or may display the layout in an area corresponding to the ground or the sky in the virtual viewpoint image. As described above, the drawing unit 206 may determine the display position of the layout based on the position and the direction of the virtual viewpoint, the positions of the objects, the content of the virtual viewpoint image and the like.

In the present exemplary embodiment, the information processing apparatus 100 generates the layout representing the positions of the objects based on the plurality of images captured by the plurality of imaging units disposed at the different positions and used for generation of the virtual viewpoint image, and displays the generated layout. For example, in a case where a global positioning system (GPS) terminal is attached to each of the objects, the information processing apparatus 100 may generate and display the layout representing the positions of the objects in the following manner. The information processing apparatus 100 may receive information on the positions of the objects from the respective GPS terminals of the objects, and generates the layout representing the positions of the objects based on the positions indicated by the received information.

As described above, in the present exemplary embodiment, the information processing apparatus 100 displays the layout representing the positions of the objects included in the drawing target scene of the virtual viewpoint image, together with the virtual viewpoint image. Accordingly, the information processing apparatus 100 can provide the user with the local information indicated by the virtual viewpoint image and the comprehensive information indicated by the layout together. As a result, the information processing apparatus 100 can support the user to grasp the entire drawing target scene of the virtual viewpoint image.

A second exemplary embodiment is described below. In the first exemplary embodiment, the processing in which the information processing apparatus 100 displays the layout representing the positions of the objects together with the virtual viewpoint image has been described. It is, however, difficult for the user to understand from which direction the displayed image is viewed, from the virtual viewpoint image and the layout provided in the first exemplary embodiment. Therefore, in the present exemplary embodiment, processing in which the information processing apparatus 100 facilitates the user to understand from which direction the virtual viewpoint image is viewed is described.

The hardware configuration of the information processing apparatus 100 according to the present exemplary embodiment is similar to the hardware configuration of the information processing apparatus 100 according to the first exemplary embodiment. The functional configuration of the information processing apparatus 100 according to the present exemplary embodiment is similar to the functional configuration of the information processing apparatus 100 according to the first exemplary embodiment except that the viewpoint control unit 202 outputs the virtual camera parameter also to the layout generation unit 205 and except for the detail of the layout generation unit 205 described below with reference to FIG. 9.

In the second exemplary embodiment, the information processing apparatus 100 lays out not only the symbols corresponding to the objects but also a symbol representing the position and the orientation (virtual viewpoint and virtual line of sight) of the virtual camera, thereby further improving the user's understanding of the entire scene.

Difference of the processing according to the present exemplary embodiment from the processing according to the first exemplary embodiment is described.

The processing for generating the layout according to the present exemplary embodiment is described with reference to FIG. 9 and FIG. 10. FIG. 9 is a diagram illustrating an example of the detail of the layout generation unit 205 according to the present exemplary embodiment. FIG. 10 is a flowchart illustrating the detail of the processing in step S304 according to the present exemplary embodiment.

Figure 5:
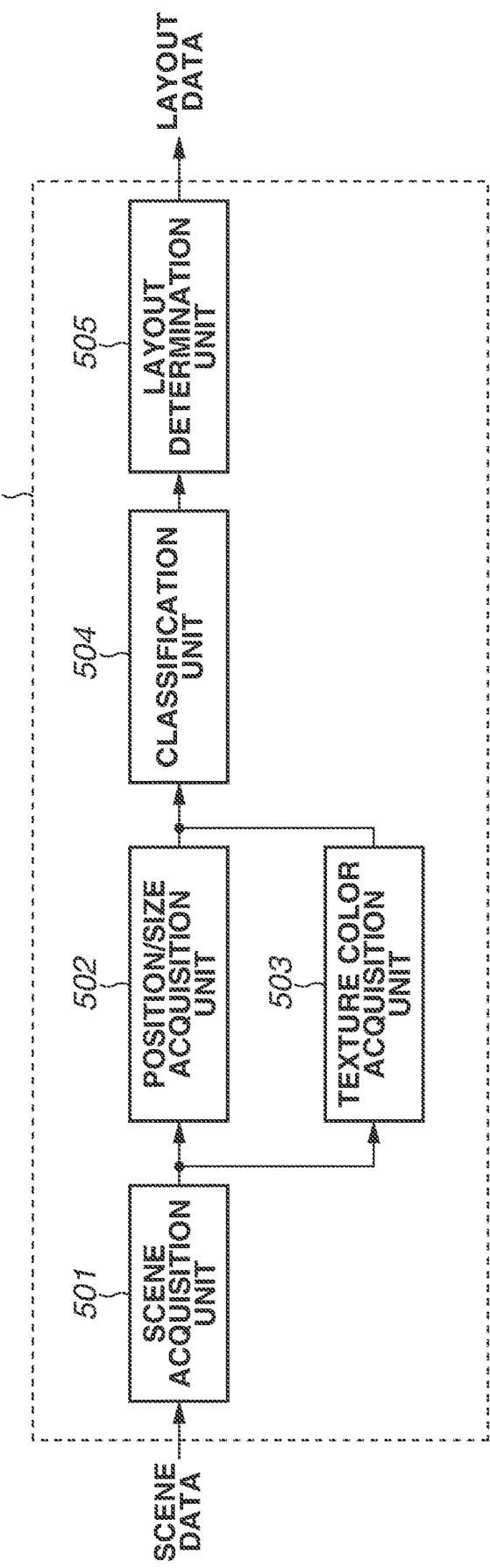
FIG. 5 is a diagram illustrating an example of detail of a layout generation unit.
Figure 6:
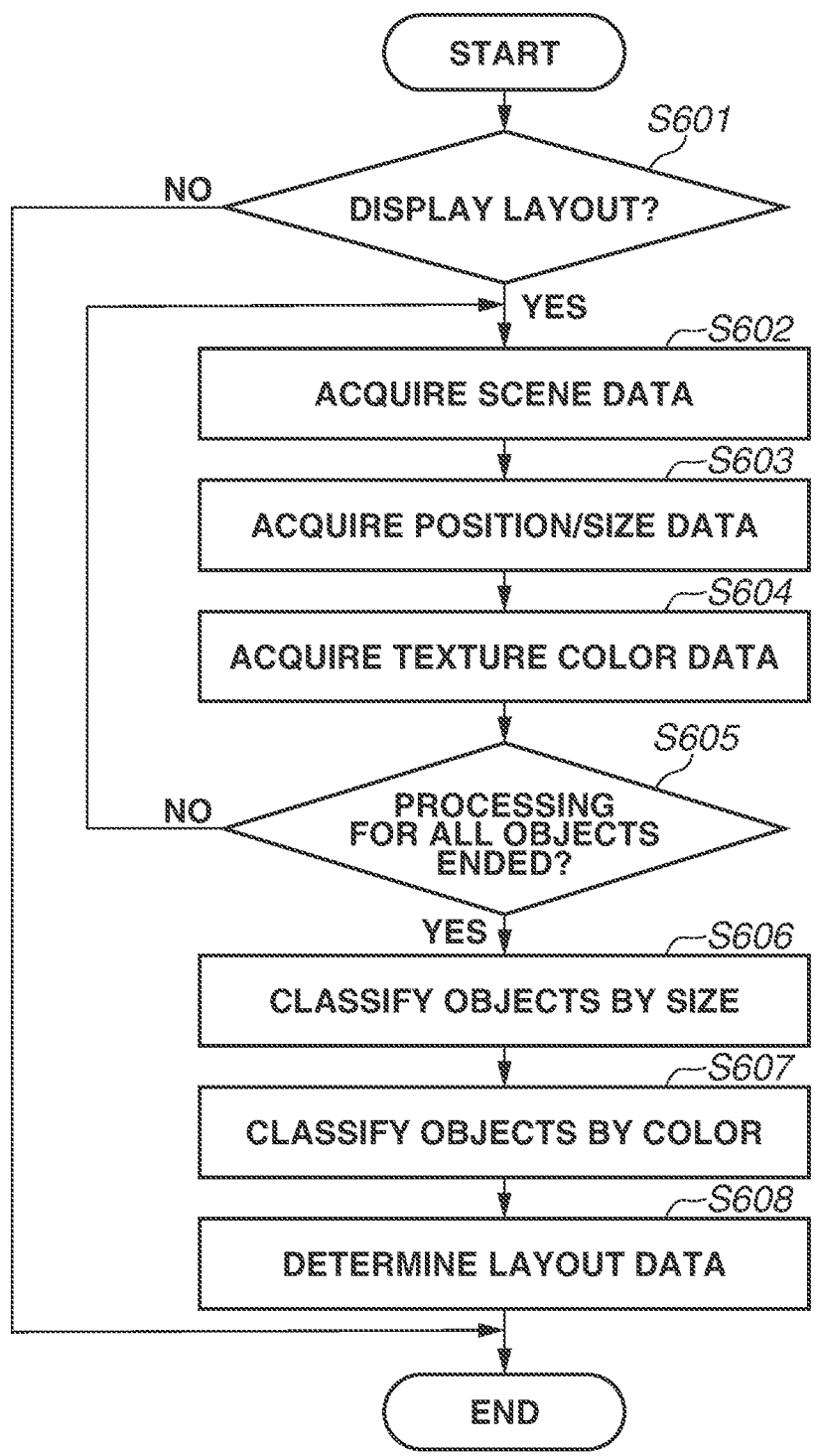
FIG. 6 is a flowchart illustrating an example of processing performed by the layout generation unit.
Figure 9:
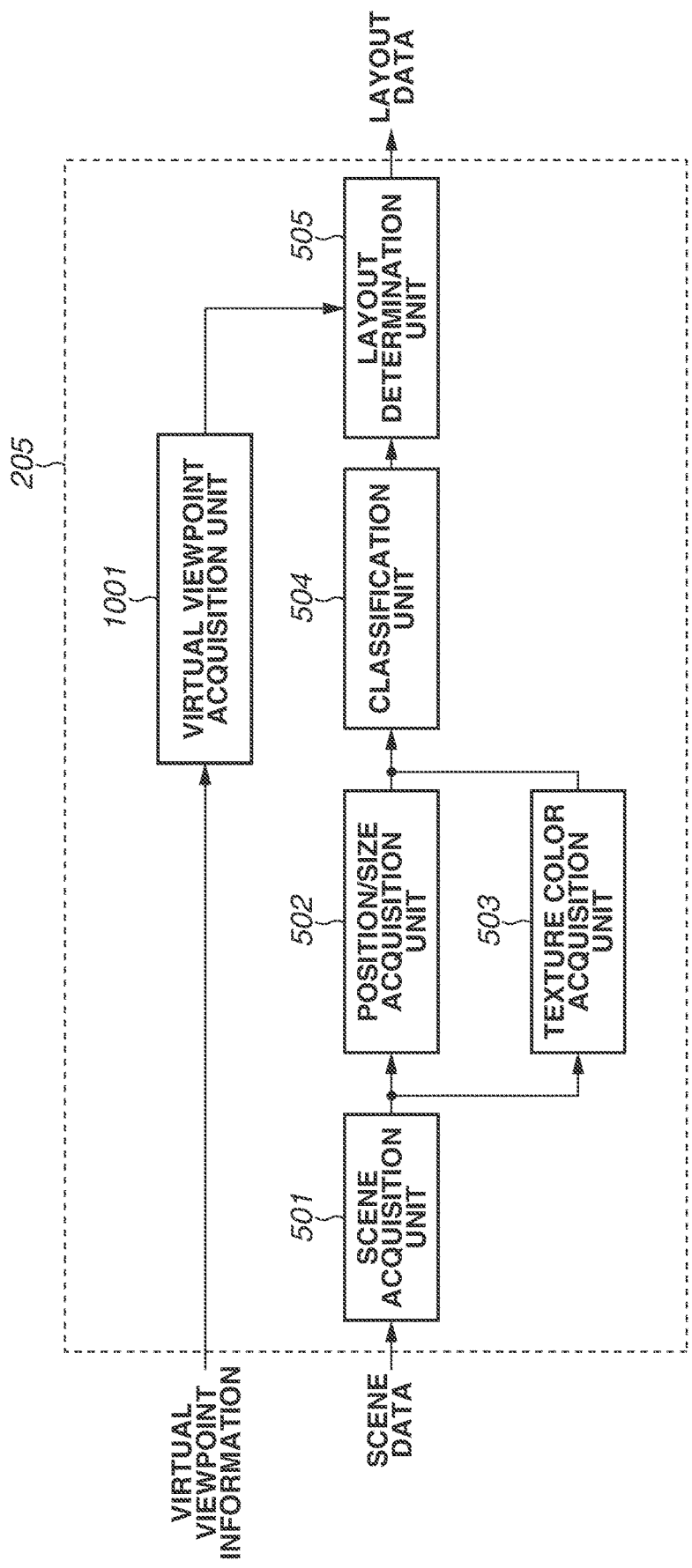
FIG. 9 is a diagram illustrating an example of the detail of the layout generation unit.
Figure 10:
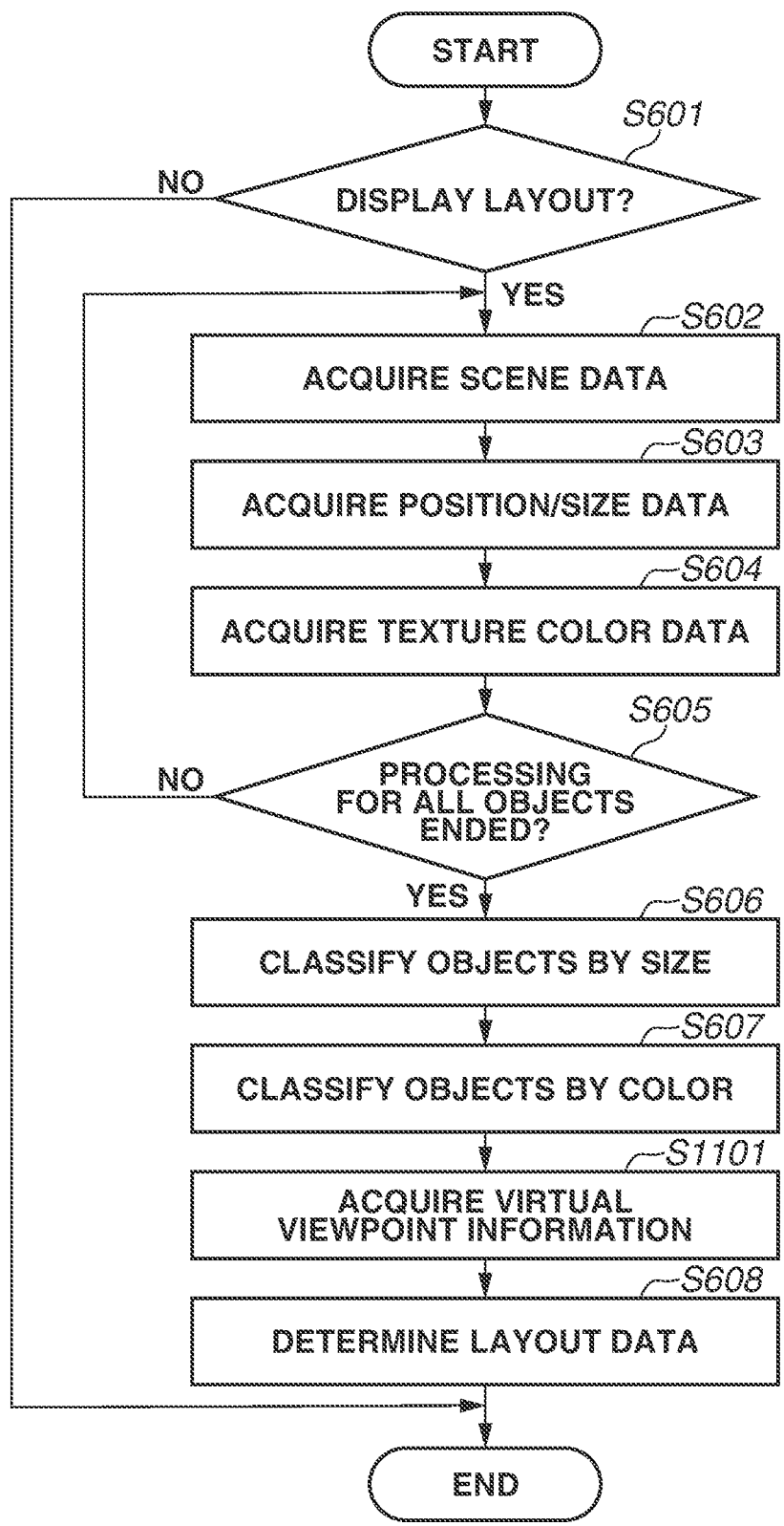
FIG. 10 is a flowchart illustrating an example of the processing performed by the layout generation unit.

The detail of the layout generation unit 205 according to the present exemplary embodiment illustrated in FIG. 9 is different from the first exemplary embodiment illustrated in FIG. 5 in that the layout generation unit 205 according to the present exemplary embodiment includes a virtual viewpoint acquisition unit 1001.

The virtual viewpoint acquisition unit 1001 acquires the virtual camera parameter from the viewpoint control unit 202. The processing in the flowchart of FIG. 10 is different from the processing according to the first exemplary embodiment illustrated in FIG. 6 in processing in step S1101 that is added and the content of the processing in step S608.

In step S1101, the virtual viewpoint acquisition unit 1001 acquires the virtual camera parameter from the viewpoint control unit 202. The viewpoint control unit 202 outputs the virtual camera parameter to the virtual viewpoint acquisition unit 1001 by performing processing similar to the processing in step S303. The virtual viewpoint acquisition unit 1001 outputs the acquired virtual camera parameter to the layout determination unit 505.

In step S608, the layout determination unit 505 performs the following processing in addition to processing similar to the processing according to the first exemplary embodiment. The layout determination unit 505 determines information on the symbol representing the position and the orientation of the virtual camera disposed in the layout. For example, the layout determination unit 505 determines a shape of the symbol representing the position and the orientation of the virtual camera to a predetermined shape. Examples of the predetermined shape include a shape that indicates two line segments starting from the same point and an acute angle formed by the line segments like a symbol 1201 described below with reference to FIG. 11, a triangular shape, a camera shape, and an arrow shape. Further, the layout determination unit 505 determines the layout position of the symbol representing the position and the orientation of the virtual camera in the layout, based on the virtual camera parameter acquired in step S1101. For example, the layout determination unit 505 specifies the position and the orientation in the layout corresponding to the position and the orientation represented by the virtual camera parameter acquired in step S1101, and determines the specified position and the specified orientation as the position and the orientation of the virtual camera in the layout.

The layout determination unit 505 outputs, to the drawing unit 206, the information on the shape of the symbol representing the position and the orientation of the virtual camera and the information on the position and the orientation of the symbol in the layout in addition to the layout data as illustrated in FIGS. 8A and 8B. The drawing unit 206 further adds the symbol representing the position and the orientation of the virtual camera to the layout in addition to the content displayed in the first exemplary embodiment based on the information acquired from the layout determination unit 505, and displays the resultant layout.

Figure 11:
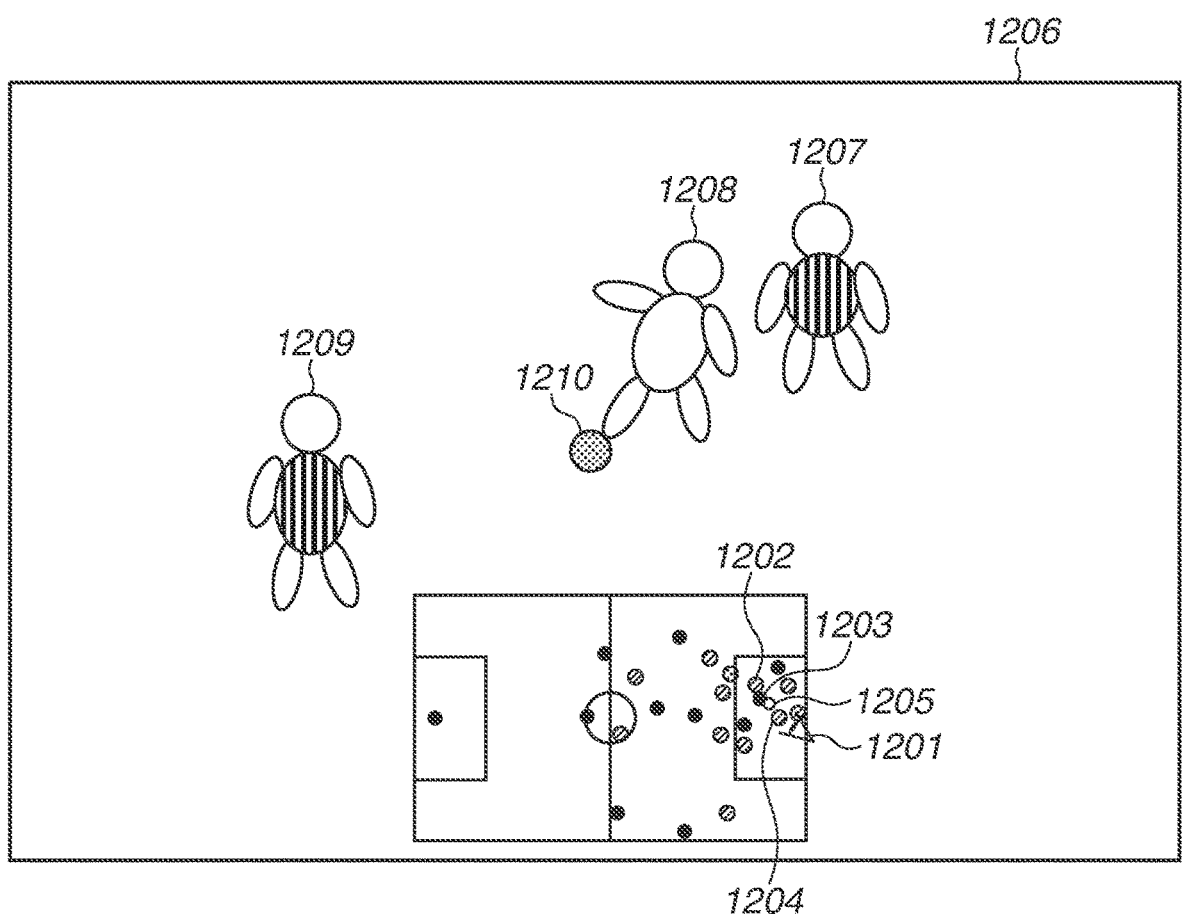
FIG. 11 is a diagram illustrating an example of the layout.

FIG. 11 is a diagram illustrating an example of the layout displayed together with the virtual viewpoint image in the present exemplary embodiment. FIG. 11 illustrates a state where a virtual viewpoint image 1206 is displayed. The layout representing the positions of the players as the objects in the football pitch is displayed on a lower part of the virtual viewpoint image 1206. The symbol 1201 represents the position and the orientation (virtual viewpoint and virtual line of sight) of the virtual camera used for generation of the virtual viewpoint image 1206. A circular symbol 1202 corresponds to an object 1207 (person). A circular symbol 1203 corresponds to an object 1208 (person). A circular symbol 1204 corresponds to an object 1209 (person). A circular symbol 1205 corresponds to an object 1210 other than a person (ball).

As illustrated in FIG. 11, the information processing apparatus 100 can facilitate the user to understand in which direction and from which position the virtual viewpoint image is viewed by, in addition to the effects by the first exemplary embodiment, further displaying the symbol representing the position and the orientation of the virtual camera as illustrated in FIG. 11.

The information processing apparatus 100 may display a layout representing a field of view of the virtual camera, in addition to the position and the orientation of the virtual camera or in place of the orientation of the virtual camera. The information processing apparatus 100 may display a layout distinguishably representing the object included in the field of view of the virtual camera and the object not included in the field of view of the virtual camera.

In the present exemplary embodiment, the information processing apparatus 100 displays the symbol having the shape like the symbol 1201 as the symbol representing the position and the orientation of the virtual camera. Alternatively, the information processing apparatus 100 may display a symbol having the other shape, such as an arrow shape, as the symbol representing the position and the orientation of the virtual camera.

The virtual camera parameter is updated so as to focus on a specific object in some cases. For example, the virtual camera parameter is updated so as to follow a specific player. In such a case, the information processing apparatus 100 may emphasize and display a symbol corresponding to the specific object of interest in the layout as compared with the other symbols. In such a case, for example, the layout determination unit 505 receives designation of the object of interest via the input device 107. Further, for example, the layout determination unit 505 changes a color of the symbol corresponding to the designated object to a color predetermined as a highlight color.

In addition, the layout determination unit 505 may output, to the drawing unit 206, information on the symbol corresponding to the object of interest. In such a case, the drawing unit 206 may emphasize the symbol by, for example, displaying the symbol in a blinking manner. The drawing unit 206 may distinguishably display a symbol specified from the positions of the plurality of symbols, for example, the symbol closest to the ball.

In the present exemplary embodiment, the information processing apparatus 100 includes the symbol representing the position and the orientation of the virtual camera in the layout. Alternatively, the information processing apparatus 100 may include a symbol representing other than the object and the position and the orientation of the virtual camera in the layout. For example, the layout determination unit 505 may perform the following processing when receiving an instruction to display a symbol corresponding to a part indicating an offside line from the user via the input device 107. The layout determination unit 505 specifies a position of a player second from the back among the positions of the objects representing players that belong to the same team. The layout determination unit 505 specifies a line that passes through the specified position and is parallel to a center line, as the offside line. Further, the layout determination unit 505 determines the layout data including a line symbol at a portion corresponding to the specified offside line. The layout determination unit 505 outputs the determined layout data to the drawing unit 206. The drawing unit 206 may display the layout including the line symbol representing the offside line on the output device 109 based on information on the output layout.

Other Exemplary Embodiments

Although the exemplary embodiments of the present disclosure have been described in detail above, the present disclosure is not limited to such specific exemplary embodiments. The above-described exemplary embodiments may be optionally combined or may be appropriately improved or optimized.

The above-described exemplary embodiments enable the user viewing the displayed virtual viewpoint image to easily understand the state in the generation target scene of the virtual viewpoint image.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

What is claimed is:

1. An information processing apparatus, comprising:
one or more hardware processors; and
one or more memories which store instructions executable by the one or more hardware processors to cause the information processing apparatus to perform at least:
generating three-dimensional shape data based on a plurality of images obtained from a plurality of imaging apparatuses;
obtaining positions, on a layout figure, of a plurality of objects in an area captured by the plurality of imaging apparatuses based on the generated three-dimensional shape data;
receiving an input for designating a first object among the plurality of objects;
generating a virtual viewpoint image so as to cause the virtual viewpoint image to follow the first object corresponding to a position of a virtual viewpoint and a direction of view from the virtual viewpoint which are designated based on the received input using the generated three-dimensional shape data; and outputting information for displaying the generated virtual viewpoint image corresponding to the position of the virtual viewpoint and the direction of view from the virtual viewpoint which are designated based on the received input and information for displaying the layout figure including a plurality of symbols representing respectively the positions of the plurality of objects in the area based on the specified positions of the plurality of objects and a symbol representing the position of the virtual viewpoint and the direction of view from the virtual viewpoint corresponding to the received input, wherein, in a case where the virtual viewpoint is generated so as to follow the first object, the layout figure is displayed so that the symbol corresponding to the first object is emphasized over the symbols corresponding to the other objects, and wherein the virtual viewpoint image is a moving image.

2. The information processing apparatus according to claim 1, wherein the layout figure is generated based on the plurality of images and camera parameters of the plurality of imaging apparatuses.

3. The information processing apparatus according to claim 1, wherein, for each of the plurality of symbols included in the layout figure, a color of a symbol representing a position of an object is determined according to a color of the object.

4. The information processing apparatus according to claim 1, wherein the plurality of objects are classified in groups according to an attribute of each object, and wherein in the layout figure, objects belonging to a same group are represented by symbols of a same type, and objects belonging to different groups are represented by symbols of different types.

5. The information processing apparatus according to claim 4, wherein the plurality of objects are classified according to at least one of a color and a size of each object.

6. The information processing apparatus according to claim 4, wherein the plurality of objects are classified according to a team to which each object belongs.

7. The information processing apparatus according to claim 4, wherein in the layout figure, objects belonging to a same group are represented by symbols of a same color, and objects belonging to different groups are represented by symbols of different colors.

8. The information processing apparatus according to claim 1, wherein the layout figure includes the plurality of symbols such that the plurality of symbols are not to be superimposed on one another.

9. The information processing apparatus according to claim 1, wherein colors of the plurality of symbols in the layout figure are determined based on a color of a display area where the layout figure is displayed based on the output information.

10. The information processing apparatus according to claim 1, wherein a position of the layout figure displayed based on the output information is changed according to a content of the virtual viewpoint image corresponding to the position of the virtual viewpoint and the direction of view from the virtual viewpoint corresponding to the received input.

11. The information processing apparatus according to claim 1, wherein a position of the layout figure is displayed on the virtual viewpoint image corresponding to the position of the virtual viewpoint and the direction of view from the virtual viewpoint corresponding to the received input.

12. The information processing apparatus according to claim 1, wherein the layout figure further includes another symbol representing a designated position in a target scene of the area.

13. The information processing apparatus according to claim 1, wherein the layout figure further includes another symbol representing an offside line of a football game in the area.

14. The information processing apparatus according to claim 1, wherein the layout figure corresponds to the area viewed from a predetermined viewpoint different from the position of the virtual viewpoint and the direction of view from the virtual viewpoint corresponding to the received input.

15. The information processing apparatus according to claim 14, wherein the predetermined viewpoint is a viewpoint above the area.

16. The information processing apparatus according to claim 14, wherein the predetermined viewpoint is not changed even if at least one of the position of the virtual viewpoint and the direction of view from the virtual viewpoint is changed.

17. The information processing apparatus according to claim 14, wherein, for each of the plurality of objects, a three-dimensional position of an object in the area is specified as the position of the object, and the position of the object represented by the symbol included in the layout figure is a two-dimensional position obtained based on the three-dimensional position of the object and the predetermined viewpoint.

18. The information processing apparatus according to claim 17, wherein the position of the object is specified based on polygon data generated based on the plurality of images obtained from the plurality of imaging apparatuses.

19. The information processing apparatus according to claim 1, wherein in a case where the layout figure is displayed so that, among the plurality of symbols included in the layout figure, a symbol corresponding to the first object included in the plurality of objects is emphasized over symbols corresponding to the other objects, a color of the symbol corresponding to the first object is different from a color of the symbols corresponding to the other objects.

20. The information processing apparatus according to claim 1, wherein the layout figure is a bird's eye view of the area.

21. An information processing method comprising:

generating three-dimensional shape data based on a plurality of images obtained from a plurality of imaging apparatuses;

obtaining positions, on a layout figure, of a plurality of objects in an area captured by the plurality of imaging apparatuses based on the generated three-dimensional shape data;

receiving an input for designating a first object among the plurality of objects;

generating a virtual viewpoint image so as to cause the virtual viewpoint image to follow the first object corresponding to a position of a virtual viewpoint and a direction of view from the virtual viewpoint which are designated based on the received input using the generated three-dimensional shape data; and outputting information for displaying the generated virtual viewpoint image corresponding to the position of the virtual viewpoint and the direction of view from the virtual viewpoint which are designated based on the received input and information for displaying the layout figure including a plurality of symbols representing respectively the positions of the plurality of objects in the area based on the specified positions of the plurality of objects and a symbol representing the position of the virtual viewpoint and the direction of view from the virtual viewpoint corresponding to the received input, wherein, in a case where the virtual viewpoint is generated so as to follow the first object, the layout figure is displayed so that the symbol corresponding to the first object is emphasized over the symbols corresponding to the other objects, and wherein the virtual viewpoint image is a moving image.

22. A non-transitory computer readable storage medium that stores a program to cause a computer to execute an information processing method, the information processing method comprising:

generating three-dimensional shape data based on a plurality of images obtained from a plurality of imaging apparatuses;

obtaining positions, on a layout figure, of a plurality of objects in an area captured by the plurality of imaging apparatuses based the generated three-dimensional shape data;

receiving an input for designating a first object among the plurality of objects;

generating a virtual viewpoint image so as to cause the virtual viewpoint image to follow the first object corresponding to a position of a virtual viewpoint and a direction of view from the virtual viewpoint which are designated based on the received input using the generated three-dimensional shape data; and outputting information for displaying the generated virtual viewpoint image corresponding to the position of the virtual viewpoint and the direction of view from the virtual viewpoint which are designated based on the received input and information for displaying the layout figure including a plurality of symbols representing respectively the positions of the plurality of objects in the area based on the specified positions of the plurality of objects and a symbol representing the position of the virtual viewpoint and the direction of view from the virtual viewpoint corresponding to the received input, wherein, in a case where the virtual viewpoint is generated so as to follow the first object, the layout figure is displayed so that the symbol corresponding to the first object is emphasized over the symbols corresponding to the other objects, and wherein the virtual viewpoint image is a moving image.

\* \* \* \* \*